United States Patent
Imada

[11] Patent Number: 5,771,403
[45] Date of Patent: Jun. 23, 1998

[54] IMAGE BLUR DETECTION APPARATUS FOR USE WITH APPARATUS INCLUDING OPERATION PORTION

[75] Inventor: Shinji Imada, Musashino, Japan

[73] Assignee: Canon Kabushiki Kaisha, Tokyo, Japan

[21] Appl. No.: 804,695

[22] Filed: Feb. 25, 1997

Related U.S. Application Data

[63] Continuation of Ser. No. 364,726, Dec. 27, 1994, abandoned.

[30] Foreign Application Priority Data

Dec. 28, 1993 [JP] Japan .................................. 5-337197

[51] Int. Cl.[6] .............................................. G03B 17/00
[52] U.S. Cl. ........................................................ 396/52
[58] Field of Search ................................ 396/52, 54, 55

[56] References Cited

U.S. PATENT DOCUMENTS 5,012,270  4/1991  Sekine et al. ........................... 354/430
5,262,820  11/1993  Tamai et al. ............................ 354/402
5,307,113  4/1994  Egawa .................................... 354/430

FOREIGN PATENT DOCUMENTS 5-31469  4/1993  Japan .

*Primary Examiner*—Russell E. Adams
*Attorney, Agent, or Firm*—Fitzpatrick, Cella, Harper & Scinto

[57] ABSTRACT

When appropriate information related to an image blur is not input in accordance with the movement state of a moving member, e.g., when the lens length becomes larger to cause an area sensor for detecting the image blur to be partially in the shade of a lens, and a light beam as the image blur information is not incident on a portion of the area sensor, a portion of the information is invalidated, e.g., information from the portion of the area sensor, which is in the shade of the lens, is not used for image blur detection, so that inappropriate information is not used for image blur prevention, thereby preventing an inappropriate image blur prevention operation.

14 Claims, 7 Drawing Sheets

WIDE

TELE

VIGNETTING BY
LENS PORTION

VIGNETTING BY
LENS PORTION

IMAGE BLUR DETECTION APPARATUS FOR USE WITH APPARATUS INCLUDING OPERATION PORTION

This application is a continuation of application Ser. No. 08/364,726 filed Dec. 27, 1994, now abandoned.

BACKGROUND OF THE INVENTION

1. Field of the Invention

The present invention relates to an apparatus including an operation portion adapted to be used with an image blur prevention device for preventing an image blur generated due to a hand vibration or the like.

2. Related Background Art

Conventionally, a control apparatus for performing image blur correction of an optical system represented by a camera, i.e., stabilizing an image by suppressing vibrations, due to a hand vibration has been proposed. This apparatus is generally constituted by a sensor for detecting vibrations, and a correction system for correcting an image blur in accordance with a signal from the sensor.

A recently proposed vibration detecting sensor has an area CCD sensor which is arranged in an AF optical system or finder optical system to perform blur correction.

When this method is applied in a single-lens reflex camera, the following problem is posed.

In a single-lens reflex camera, a mirror-up state is set during photographing, i.e., exposure, so that a light beam is guided onto a film surface. That is, the light beam is not guided to the AF optical system or the finder optical system, so no image can be detected by the area CCD sensor during exposure. As a countermeasure against this problem, an image blur correction operation is performed by prediction of an image blur state while no image can be detected. However, accurate image blur correction can hardly be performed by this method.

In another method, an optical system exclusively used for image detection is provided independent of a photographing optical system. An image in this optical system is detected by an area sensor, and two outputs from the area sensor at different times are calculated by known correlation calculation, thereby detecting an image blur of the camera. When image blur correction is performed in accordance with the image blur output, accurate blur correction becomes possible even during exposure.

However, along with a size reduction of a camera, the problem of vignetting of a detected image, which is caused by a lens portion, becomes more serious. When correlation calculation is performed for this area subjected to vignetting, the image blur amount cannot be accurately detected.

Additionally, in a camera having a zoom function, the lens extension amount changes depending on the focal length, and the portion subjected to vignetting accordingly changes.

In a single-lens reflex camera using interchangeable lenses, the portion subjected to vignetting also changes depending on the attached lens.

This phenomenon will be described with reference to FIGS. 7A to 7D. Referring to FIGS. 7A to 7D, an area sensor outer measurement window 51 is arranged in a camera. FIG. 7A shows a state in which the focal length is small (WIDE), and FIG. 7C shows a state in which the focal length is large (TELE).

As shown in FIGS. 7A and 7B, the lens extension amount in the TELE state is larger than that in the WIDE state. For this reason, in the TELE state shown in FIG. 7D, the portion subjected to vignetting in an image signal input to the area sensor becomes larger than that in the WIDE state shown in FIG. 7B.

If a further size reduction or a zoom function at a higher zoom ratio is to be achieved for a camera, this problem of vignetting is expected to become more serious.

SUMMARY OF THE INVENTION

According to one aspect of the invention, there is provided an image blur prevention apparatus, an apparatus adapted to be used therewith, or an optical equipment such as a camera, comprising:

first means for inputting information related to an image blur; and second means for invalidating a portion of the information inputted to the first means, the second means operating in association with a movement of an operation portion adapted to be used together with the apparatus, which movement inhibits an input of the information.

With this arrangement, inappropriate information is not used for image blur prevention as information related to an image blur, thereby preventing an inappropriate image blur prevention operation.

DETAILED DESCRIPTION OF THE PREFERRED EMBODIMENTS

The embodiments of the present invention will be described below with reference to the accompanying drawings.

[First Embodiment]

Figure 1:
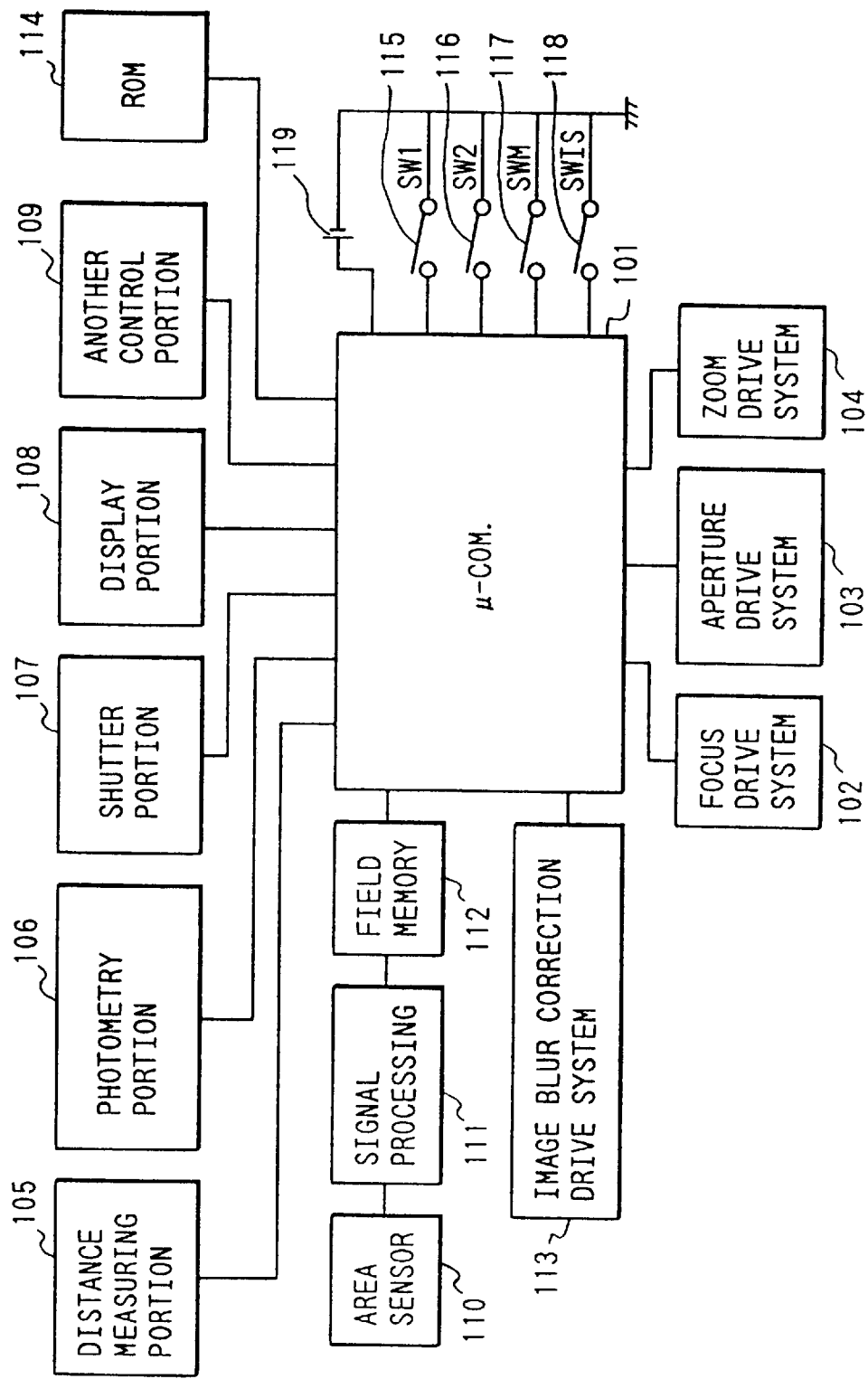
FIG. 1 is a block diagram showing the constituent elements of the first embodiment of the present invention.

FIG. 1 is a block diagram of a camera of the first embodiment of the present invention.

The camera of this embodiment has the same outer appearance as that of the camera shown in FIG. 7A to 7D. As the focal length becomes larger, the lens projects forward.

The camera includes a μ-com. 101 for controlling the entire camera, a focus drive system 102, an aperture drive system 103, and a zoom drive system 104. The camera also includes a distance measuring portion 105, a photometry portion 106, a shutter portion 107, a display portion 108, and another control portion 109.

An area sensor 110 receives image information from an optical system dedicated to camera vibration detection. A field memory 112 stores an image signal from a signal processing circuit 111. Known correlation calculation of two image data at different times is two-dimensionally performed, thereby detecting an image blur. An image blur correction drive system 113 operates in accordance with the image blur data.

A ROM 114 stores data representing an effective area of the area sensor in accordance with the focal length.

The camera also includes a switch 115 (SW1) for photometry and distance measurement, and a release switch 116 (SW2). Generally, the switches 115 and 116 constitute a two-stroke switch. That is, the switch 115 is turned on at the first stroke position of a release button, and the switch 116 is turned on at the second stroke position. An exposure mode selection switch 117 (SWM) is used for a mode change. A mode change operation is performed by turning on/off the switch 117, or simultaneously operating the switch 117 and other operation members. An image blur correction drive selection switch 118 (SWIS) is turned on when an image blur correction operation is to be selected. This electrical system is energized from a power supply 119.

Figure 2:
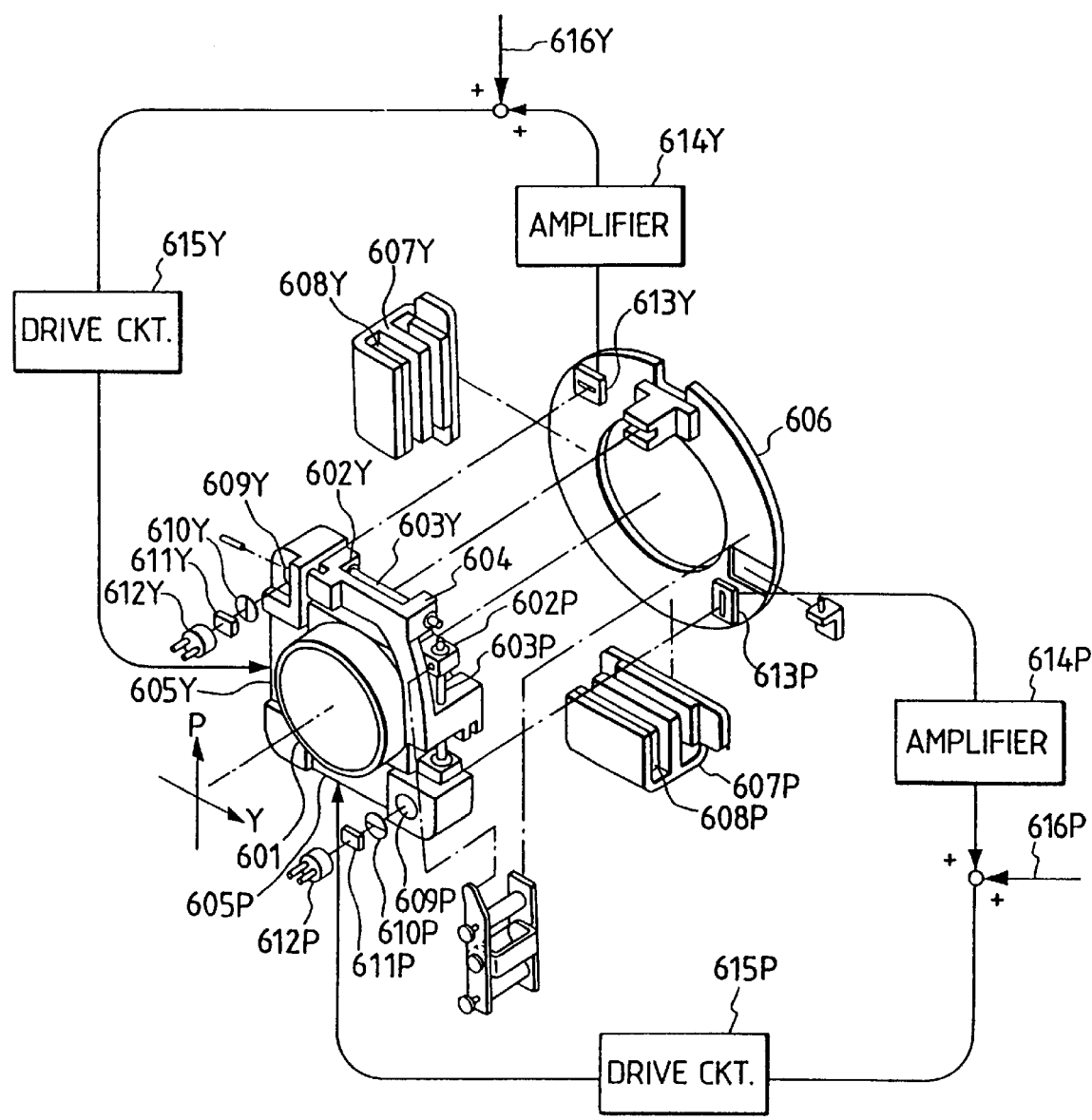
FIG. 2 is an exploded perspective view for explaining the schematic arrangement of an image blur correction apparatus used in an embodiment of the present invention.

FIG. 2 shows an apparatus for optically performing image blur correction, which is an example of the image blur correction drive system in FIG. 1.

The image blur correction mechanism is driven in two directions which are perpendicular to each other and are also perpendicular to the optical axis (e.g., pitch P and yaw Y directions). The mechanism has the same arrangement in both directions, and only that in the pitch direction will be described. Referring to FIG. 2, a correction lens holding frame 601 is slidably moved on a pitch slide shaft 603p through a slide bearing 602p. The pitch slide shaft 603p is attached to an intermediate arm 604.

The driving force generating mechanism of the lens holding frame 601 will be described below. A coil 605p is attached to the lens holding frame 601. A magnetic circuit constituted by a yoke 607p and a permanent magnet 608p is fixed to a fixing frame 606. The lens holding frame 601 is driven in the pitch direction upon energization to the coil 605p.

The displacement detection mechanism of the lens holding frame will be described below. A slit 610p, a condenser lens 611p, and an infrared light-emitting diode (IRED) 612p are arranged in a hole 609p formed in the lens holding frame 601. A light-receiving device (PSD) 613p is arranged on the fixing frame 606 opposing the IRED 612p. A near infrared light beam emitted from the IRED 612p is projected onto the PSD 613p through the slit 610p. When the PSD 613p outputs a signal corresponding to the position of the light beam, the displacement of the lens holding frame 601 can be detected. When an output from the light-receiving device 613p is amplified by an amplifier 614p and input to the coil 605p through a drive circuit 615p, the lens holding frame 601 is driven to change the output from the light-receiving device 613p. This operation forms a closed system indicated by a solid line and stabilizes at a point (neutral point) where the output from the light-receiving device becomes zero.

When an image blur signal 616p from the μ-com. 101 in FIG. 1, which corresponds to an image blur amount, is added to such a system, the lens holding frame 601 precisely follows up using the blur amount as a neutral point and is driven to correct the image blur.

The operation will be described below with reference to a flow chart in FIG. 3.

Figure 3:
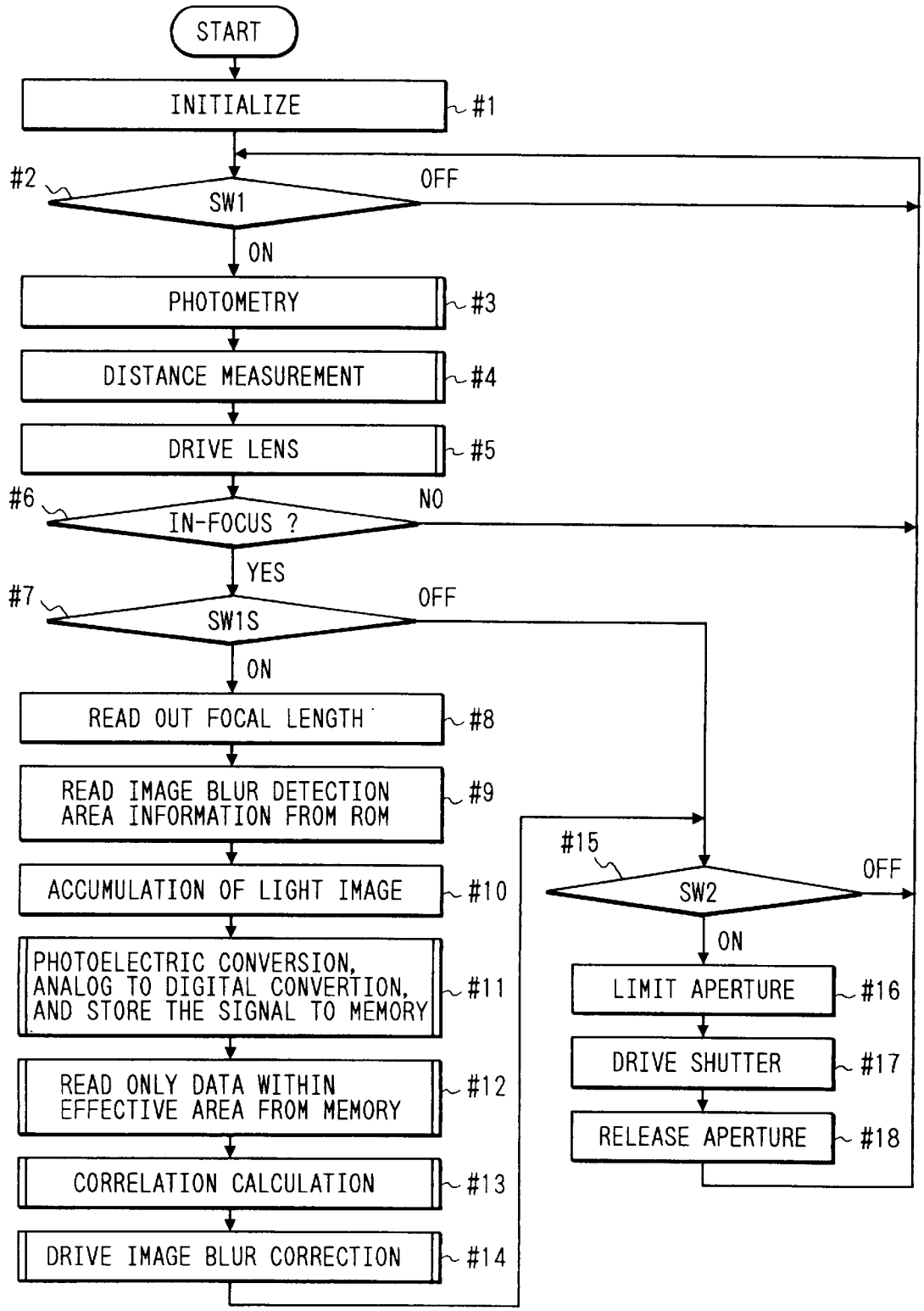
FIG. 3 is a flow chart showing the operation procedures of the first embodiment of the present invention.

Upon power ON from the power supply circuit, the camera μ-com. 101 starts control from step [#1] in FIG. 3.

[#1]: The camera μ-com. 101 is initialized.

[#2]: The state of the SW1 is checked. When the SW1 is turned on, the flow advances to step [#3].

[#3]: Photometry is performed by the photometry portion 106.

[#4]: Distance measurement is performed by the distance measuring portion 105.

[#5]: The focus lens is driven by the focus drive system 102.

[#6]: An in-focus state is checked. When an in-focus state is not detected, the flow returns to step [#2] to repeat the above operation. When an in-focus state is detected, the flow advances to step [#7].

[190 7]: The state of the SWIS is checked. When the SWIS is in an OFF state, the image blur correction operation is stopped, and the flow advances to step [#15]; otherwise, the flow advances to step [#8].

[#8]: A focal length is read out.

[#9]: Information of an area of the area sensor, which is usable for image blur detection and corresponds to the readout focal length, is read out from the ROM. As the focal length becomes larger, and the distal end of the lens projects forward, the area subjected to vignetting in the area sensor becomes larger accordingly. For this reason, the area usable for image blur detection stored in the ROM is set to become smaller as the focal length becomes larger.

[#10]: Accumulation of a light image is started.

[#11]: Upon reaching a predetermined accumulation level, analog to digital conversion of a light image conversion signal is performed. A digital signal a (i, j) of the image is sequentially stored in the memory.

[#12]: From the information of the area usable for image blur detection, which is read out from the ROM in step [#9], only data within the usable area is read out from the memory.

[#13]: Correlation calculation of a signal a' (i, j) in the immediately preceding sequence and the above signal a (i, j) is performed, thereby detecting an image blur.

[190 14]: The image blur correction drive system 113 is operated in accordance with the detected image blur data, thereby performing image blur correction.

[#15]: The state of the SW2 is checked. When the SW2 is in an OFF state, the flow returns to step [#2]; otherwise, the flow advances to step [#16].

[#16]: The aperture is limited by the aperture drive system 103.

[#17]: The shutter is driven by the shutter portion 107.

[#18]: The aperture is released.

With the above operation, even when vignetting of the area sensor is caused, correlation calculation is performed while omitting image data within the area subjected to vignetting. Therefore, image blur detection can be accurately performed.

[Second Embodiment]

Figure 4:
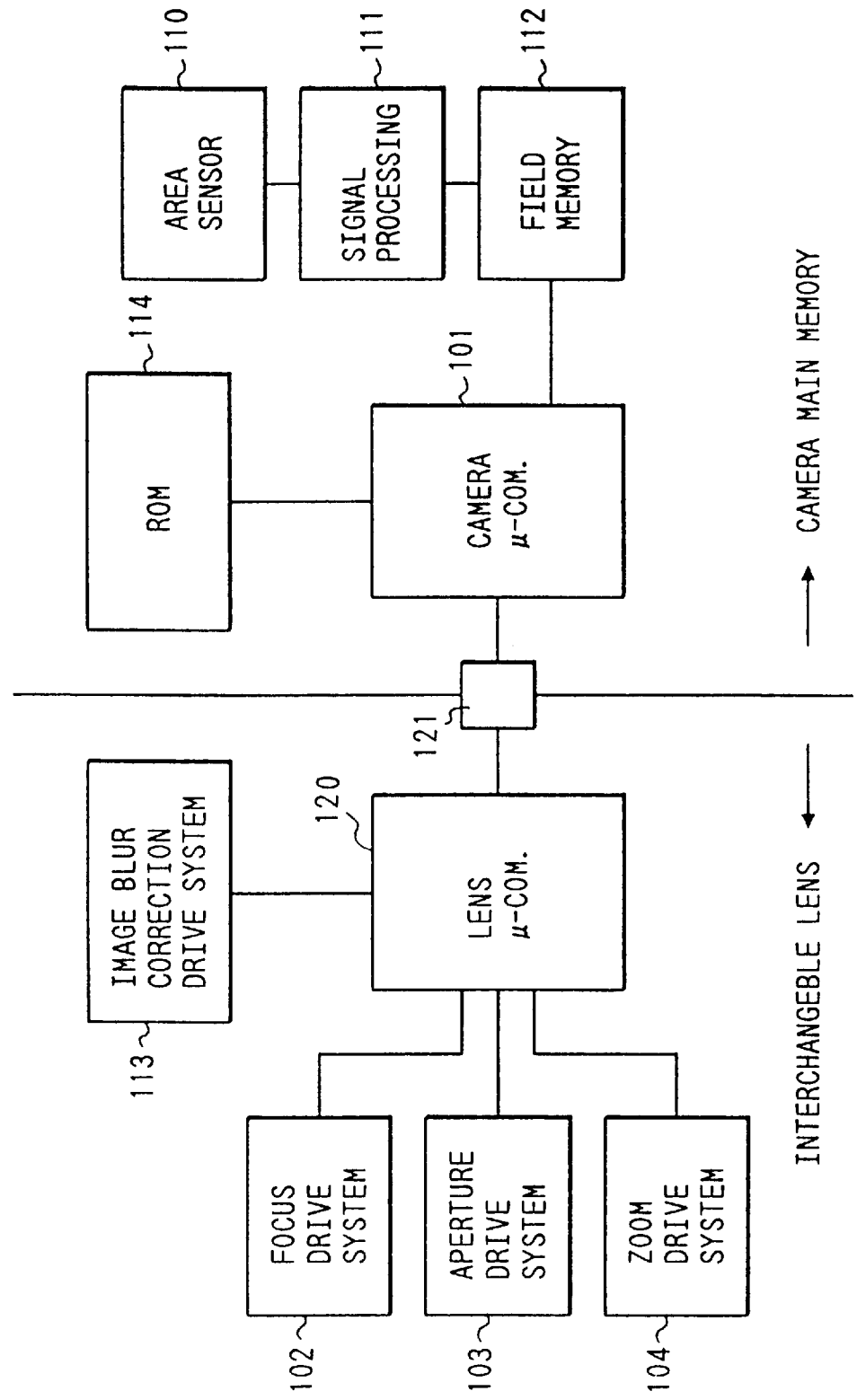
FIG. 4 is a block diagram showing the constituent elements of the second embodiment of the present invention.

FIG. 4 is a block diagram showing the second embodiment of the present invention, in which the present invention is applied in a single-lens reflex camera using an interchangeable lens. A description of the same portions as those in the first embodiment will be omitted. In a camera system of this embodiment as well, as the focal length becomes larger, the distal end of an interchangeable lens extends forward.

Referring to FIG. 4, a lens μ-com. 120 controls the internal system of a lens and is connected to a camera μ-com. 101 through an interface 121 with respect to the camera main body so as to transmit/receive information from/to the camera main body. An image blur correction drive system is also controlled by the lens μ-com. 120.

The operation of this embodiment will be described below with reference to FIGS. 5 and 6.

Figure 5:
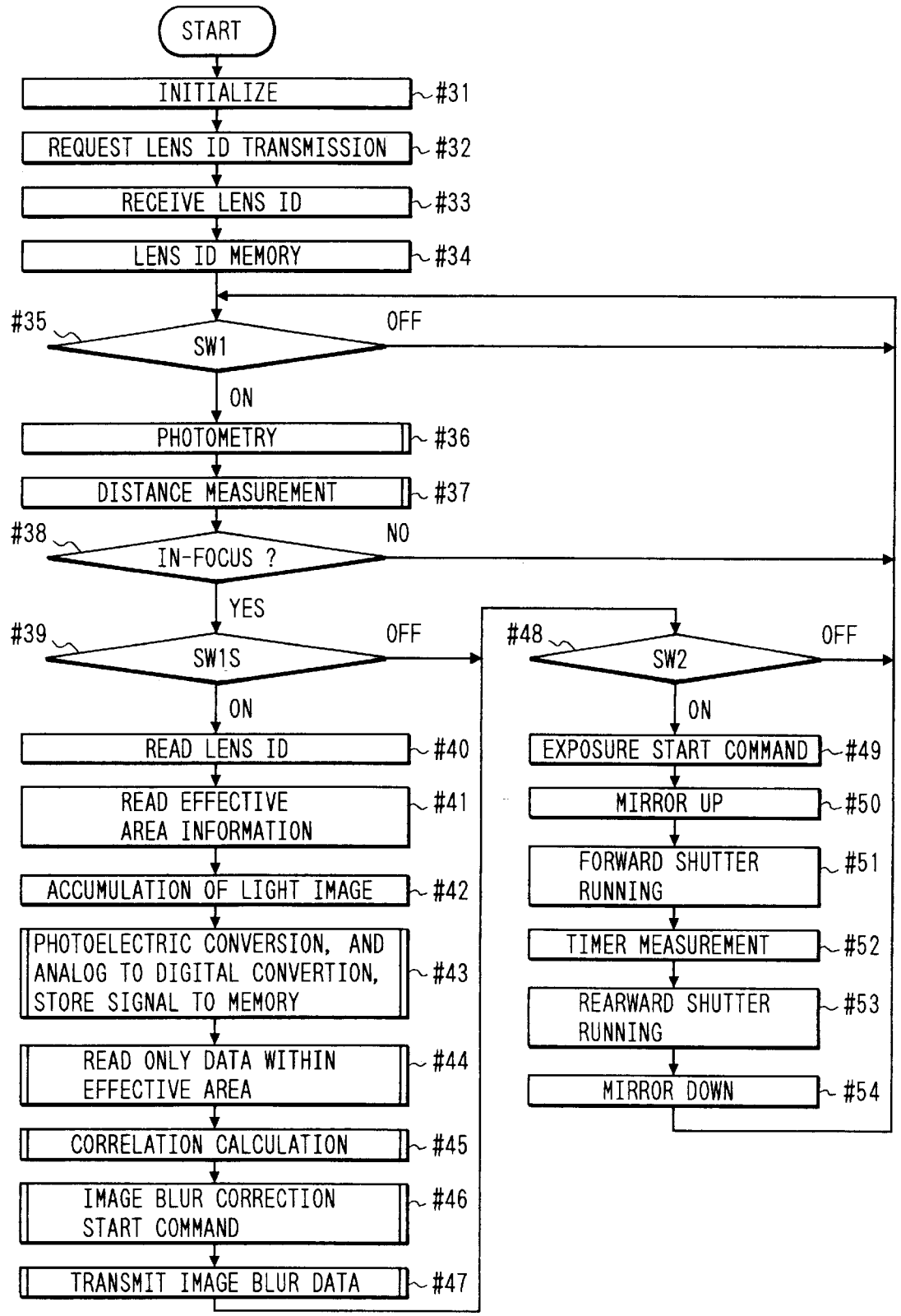
FIG. 5 is a flow chart showing the operation procedures of the second embodiment of the present invention.

FIG. 5 is a flow chart showing the operation of the camera main body. Upon power ON from a power supply circuit, the camera μ-com. 101 starts control from step [#31] in FIG. 5.

[#31]: The camera μ-com. 101 is initialized.

[#32]: A command for requesting transmission of a lens ID representing the type of the attached lens as numerical data is sent to the lens.

[#33]: Reception of the lens ID is completed.

[#34]: The lens ID data is stored.

[#35]: The state of an SW1 is checked. When the SW1 is turned on, the flow advances to step [#36].

[#36]: Photometry is performed by a photometry portion 106.

[#37]: Distance measurement is performed by a distance measuring portion 105, and focal point adjustment data is transmitted to the lens.

[#38]: An in-focus state is checked. When an in-focus state is not detected, the flow returns to step [#35] to repeat the above operation. When an in-focus state is detected, the flow advances to step [#39].

[#39]: The state of an SWIS is checked. When the SWIS is in an OFF state, the flow advances to step [#48]; otherwise, the flow advances to step [#40].

[#40]: The lens ID is read.

[#41]: Information of an area of an area sensor, which is usable for image blur detection and corresponds to the readout lens ID, is read out from a ROM.

[#42]: Accumulation of a light image is started.

[#43]: Upon reaching a predetermined accumulation level, analog to digital conversion of a light image conversion signal is performed. A digital signal a (i, J) of the image is sequentially stored in the memory.

[#44]: From the information of the area usable for image blur detection, which is read out from the ROM in step [#41], only data within the usable area is read out from the memory.

[#45]: Correlation calculation of a signal a' (i, j) in the immediately preceding sequence and the above signal a (i, J) is performed, thereby detecting an image blur.

[#46]: An image blur correction start command is transmitted to the lens.

[#47]: The detected image blur data is transmitted to the lens.

[#48]: The state of an SW2 is checked. When the SW2 is in an OFF state, the flow returns to step [#35]; otherwise, the flow advances to step [#49].

[#49]: An exposure start command and data including an aperture value are transmitted to the lens.

[#50]: A mirror-up operation is performed.

[#51]: Forward shutter running is performed by a shutter portion 107.

[#52]: Timer measurement is performed for a time in seconds corresponding to a set shutter speed.

[#53]: Rearward shutter running is performed by the shutter portion 107.

[#54]: A mirror-down operation is performed, thereby finishing photographing.

Figure 6:
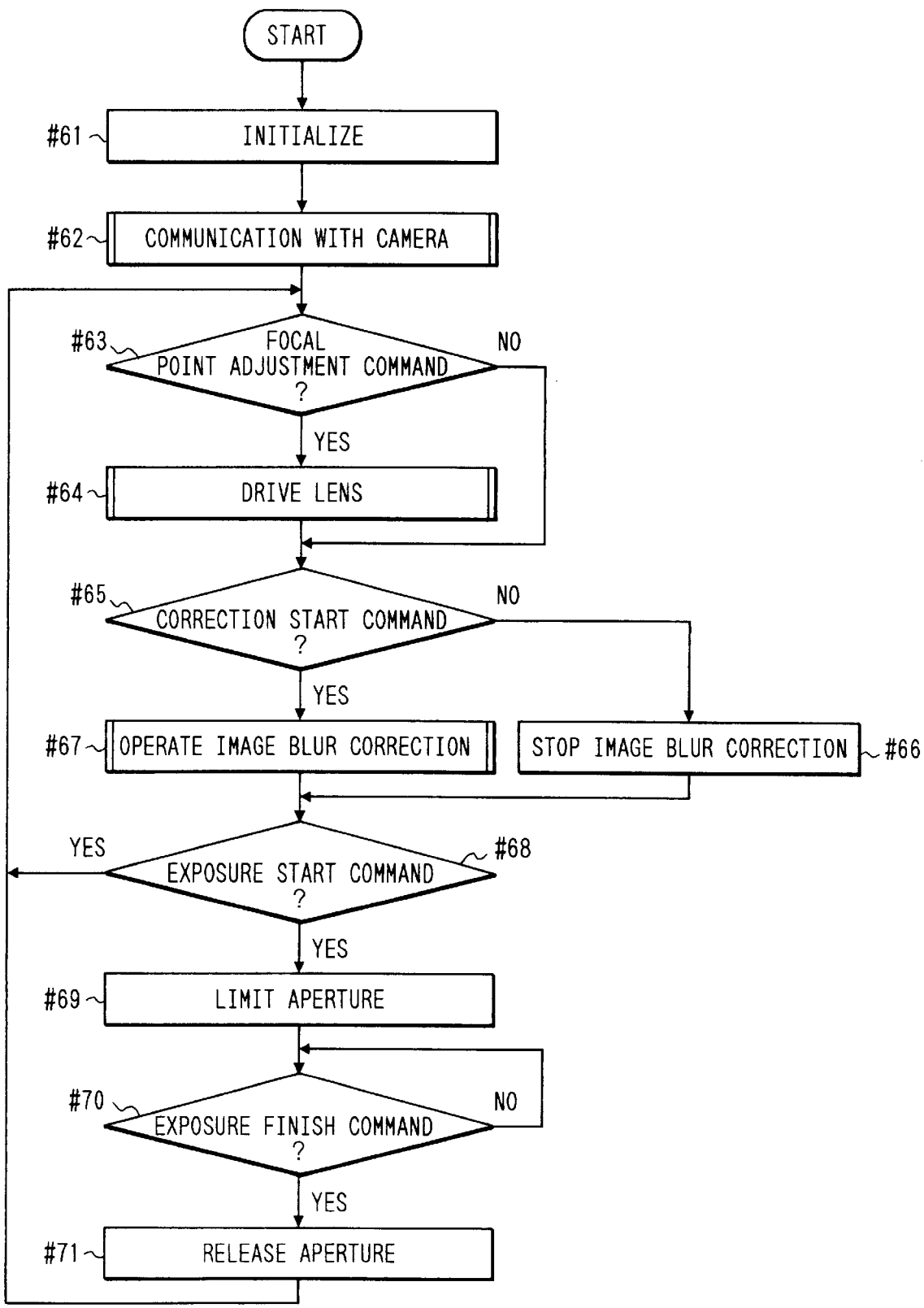
FIG. 6 is a flow chart showing the operation procedures of the second embodiment of the present invention.
Figure 7A:
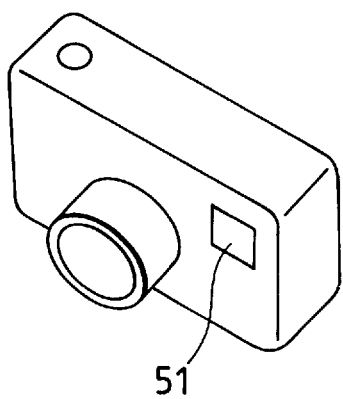
FIGS. 7A to 7D are views showing relationships between the outer appearance and vignetting in a camera having a conventional image blur correction apparatus.
Figure 7C:
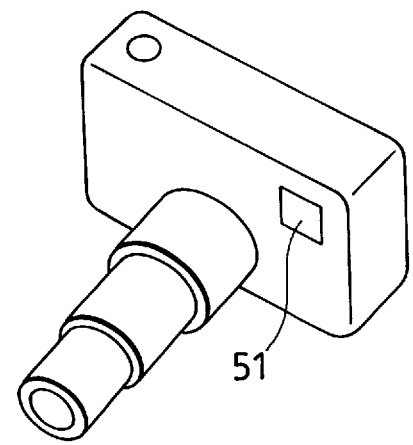
Figure 7B:
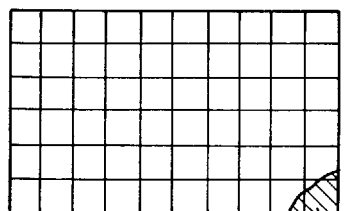
Figure 7D:
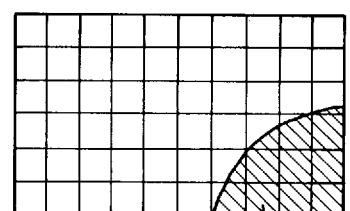

FIG. 6 is a flow chart showing the operation of the lens side.

[#61]: The lens μ-com. 120 is initialized.

[#62]: Communication with the camera is performed.

[#63]: Reception of the focal point adjustment data is checked.

[#64]: The lens is driven on the basis of the focal point adjustment data.

[#65]: Reception of an image blur correction start command is checked.

[#66]: The image blur correction operation is stopped.

[#67]: The image blur correction drive system is operated in accordance with the image blur data sent from the camera side.

[#68]: Reception of an exposure start command is checked.

[#69]: The aperture is limited.

[#70]: Reception of an exposure finish signal is checked.

[#71]: The aperture is released.

With the above operation, even when vignetting of the area sensor is caused, correlation calculation is performed while omitting image data within the area subjected to vignetting. Therefore, image blur detection can be accurately performed.

As for a lens which has a small portion subjected to vignetting and cannot detect an image blur, a sequence in which image blur correction is not performed is added. In this case, image blur correction can be further accurately performed.

For a lens whose total length changes in zoom and focus operations, zoom and focus information can be added to data within an image blur detection area and stored in the ROM.

The effective area of the area sensor may be changed upon a determination of the presence/absence of the attachment of an extender or extension tube.

As has been described above, according to the image blur correction apparatus of each of the embodiments of the present invention, the effective area of an output from the area sensor used for image blur detection is changed in accordance with the shape, focal length, focus position, and the like of a photographing lens. Image blur detection is not performed in an area determined as an ineffective area, thereby accurately performing image blur detection according to the state of the photographing lens.

The present invention can also be applied in cameras such as a single-lens reflex camera, a lens-shutter camera, and a video camera, optical equipment other than cameras or other apparatuses, or units constituting these apparatuses.

In the present invention, each of the elements of the claims or embodiments or part thereof may be arranged in an independent apparatus. For example, the blur detection apparatus may be arranged in the camera main body, the blur correction apparatus may be arranged in a lens barrel attached to the camera, and a control apparatus for controlling these elements may be arranged in an intermediate adapter.

In the present invention, the blur prevention means is not limited to a means for directly preventing a blur and may also be a means for warning a user of generation of a blur or possibility thereof with light, sound, or the like to attract the user's attention, thereby indirectly preventing a blur.

In the present invention, any blur prevention means can be employed as far as it can prevent a blur. For example, a shift optical system in which optical members are moved in a plane perpendicular to the optical axis, a light beam changing means such as a variable apical angular prism, a means for moving a photographing surface in a plane perpendicular to the optical axis, or a means for correcting a blur by image processing can also be used.

The above embodiments or their technical elements may be combined with each other as needed.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical apparatus adapted to be used with an image blur prevention device, comprising:

an image blur sensor that detects image blur information for a plurality of detection areas in an image plane;

an information detection device that detects optical information of an optical lens; and a determination device that determines a detection area used for an image blur prevention operation from among said plurality of detection areas based on the optical information detected by said information detection device.

2. An optical apparatus according to claim 1, wherein said optical information of the optical lens is information relating to a focal length of the optical lens.

3. An optical apparatus according to claim 2, wherein said determination device includes a memory in which a relation between the focal length and the detection area used for the image blur prevention operation is stored.

4. An optical apparatus according to claim 1, wherein said optical lens is a zooming optical system and said optical information of the optical lens is information relating to a zoom lens position.

5. An optical apparatus according to claim 1, wherein said optical lens is a focusing optical system and said optical information of the optical lens is information relating to a focus lens position.

6. An optical apparatus according to claim 1, wherein said optical information of the optical lens is identity information output from the optical lens.

7. An optical apparatus according to claim 6, wherein said determination device includes a memory in which a relation between the identity information of the optical lens and the detection area used for the image blur prevention operation is stored.

8. An optical apparatus adapted to be used with an image blur detection device, comprising:

an image blur sensor that detect image blur information in a plurality of detection areas in an image plane;

an information detection device that detects optical information of an optical lens; and a determination device that determines a detection area used for an image blur detection operation from among said plurality of detection areas based on the optical information detected by said information detection device.

9. An optical apparatus according to claim 8, wherein said optical information of the optical lens is information relating to a focal length of the optical lens.

10. An optical apparatus according to claim 9, wherein said determination device includes a memory in which a relation between the focal length and the detection area used for the image blur detection operation is stored.

11. An optical apparatus according to claim 8, wherein said optical lens is a zooming optical system and said optical information of the optical lens is information relating to a zoom lens position.

12. An optical apparatus according to claim 8, wherein said optical lens is a focusing optical system and said optical information of the optical lens is information relating to a focus lens position.

13. An optical apparatus according to claim 8, wherein said optical information of the optical lens is identity information output from the optical lens.

14. An optical apparatus according to claim 13, wherein said determination device includes a memory in which a relation between the identity information of the optical lens and the detection area used for the image blur detection operation is stored.

* * * * *

UNITED STATES PATENT AND TRADEMARK OFFICE
CERTIFICATE OF CORRECTION

PATENT NO. : 5,771,403
DATED : June 23, 1998
INVENTOR(S) : SHINJI IMADA

It is certified that error appears in the above-identified patent and that said Letters Patent is hereby corrected as shown below:

In the Drawings:

DRAWING SHEET 4 OF 7:

FIG. 4

"INTERCHANGEBLE" should read --INTERCHANGEABLE--.

COLUMN 1:

Line 19, "vibration" should read --vibration,--.

COLUMN 4:

Line 42, "[190 14]:" should read --[#14]:--.

COLUMN 5:

Line 41, "(i, J)" should read --(i, j)--.
Line 49, "(i, J)" should read --(i, j)--.

Signed and Sealed this

Sixth Day of July, 1999

Q. TODD DICKINSON

*Attest:*

*Attesting Officer*  *Acting Commissioner of Patents and Trademarks*